US012782749B2

(12) United States Patent
Khayat

(10) Patent No.: US 12,782,749 B2
(45) Date of Patent: Nov. 3, 2026

(54) VEHICLE PART WITH USER INTERFACE

(71) Applicant: Compagnie Plastic Omnium SE, Lyons (FR)

(72) Inventor: Issam Khayat, Sainte-Julie (FR)

(73) Assignee: Compagnie Plastic Omnium SE, Lyons (FR)

( * ) Notice: Subject to any disclaimer, the term of this patent is extended or adjusted under 35 U.S.C. 154(b) by 617 days.

(21) Appl. No.: 18/081,797

(22) Filed: Dec. 15, 2022

(65) Prior Publication Data

US 2023/0194890 A1 Jun. 22, 2023

(30) Foreign Application Priority Data

Dec. 17, 2021 (FR) ....................................... 2113813

(51) Int. Cl.

| | |
|---|---|
| ***G02B 30/56*** | (2020.01) |
| ***B60K 35/10*** | (2024.01) |
| ***B60K 35/21*** | (2024.01) |
| ***B60K 35/231*** | (2024.01) |
| ***B60K 35/60*** | (2024.01) |
| ***B60K 35/81*** | (2024.01) |
| ***B60Q 1/50*** | (2006.01) |
| ***G02B 27/01*** | (2006.01) |

(52) U.S. Cl.

CPC .............. *G02B 30/56* (2020.01); *B60K 35/10* (2024.01); *B60K 35/211* (2024.01); *B60K 35/213* (2024.01); *B60K 35/231* (2024.01); *B60K 35/60* (2024.01); *B60K 35/81* (2024.01); *B60Q 1/50* (2013.01); *G02B 27/0103* (2013.01); *B60K 2360/28* (2024.01); *B60K 2360/29* (2024.01); *B60Q 2400/50* (2013.01)

(58) Field of Classification Search

CPC ............................ G02B 27/0103; G02B 30/56

See application file for complete search history.

(56) References Cited

U.S. PATENT DOCUMENTS

| | | | | |
|---|---|---|---|---|
| 2015/0116297 | A1 | 4/2015 | Nemchuk et al. | |
| 2020/0218044 | A1* | 7/2020 | Weindorf ............... | G02B 30/56 |
| 2020/0400943 | A1 | 12/2020 | Kessler et al. | |

FOREIGN PATENT DOCUMENTS

| | | | | |
|---|---|---|---|---|
| CN | 109471261 | A * | 3/2019 | ......... G02B 27/0101 |
| DE | 102016214478 | A1 * | 2/2018 | |
| DE | 102020205207 | A1 | 10/2021 | |
| EP | 3795406 | A1 * | 3/2021 | ............. B60K 35/10 |

OTHER PUBLICATIONS

Search Report in FR Patent Application No. 2113813 dated Jul. 27, 2022.

* cited by examiner

*Primary Examiner* — Paisley L Wilson

(74) *Attorney, Agent, or Firm* — Dilworth IP, LLC

(57) ABSTRACT

A vehicle part including a light source capable of emitting a light image, a micro-mirror plate capable of projecting the light image outside the vehicle part in the form of a hologram, a privacy filter located between the light source and the hologram, and a sensor capable of detecting the presence of any object in a projection plane coinciding at least partially with the hologram.

18 Claims, 4 Drawing Sheets

VEHICLE PART WITH USER INTERFACE

FIELD OF THE INVENTION

The invention relates to a motor vehicle part. More particularly, the invention relates to a motor vehicle part having a user interface.

BACKGROUND OF THE INVENTION

The state of the art is already known for motor vehicles having a human/machine interface (HMI) allowing the vehicle to communicate with a person and/or allowing a user to communicate with the vehicle. In the first case, it may be visual information presented by the vehicle to the attention of the user of the vehicle. In the second case, it may be instructions given by the user to the vehicle, for example to validate an action to be performed on the vehicle. The communication can take place in both directions, as for example in the case where the user instructs the vehicle to open a door and the vehicle asks the user to enter a predetermined code before carrying out the requested task.

Such an interface can be in the form of a touchscreen arranged on the body of the vehicle coupled with an electronic control unit (ECU). The information given by the vehicle is displayed on the screen, and the user can press the screen to give instructions, for example by pressing a touchpad or having his fingerprint read.

This interface is interesting, but poses some problems. Indeed, the body of the vehicle is exposed to the outside environment, which means that it may be dirty, in which case it is preferable not to touch the touchscreen for hygienic reasons. Conversely, touching a touchscreen with one's fingers generally leaves a grease mark on it, which affects the appearance of the touchscreen and therefore of the vehicle. In addition, a touchscreen generally malfunctions when the user's fingers are wet, such that the touchscreen may be inoperative in the rain.

In order to remedy these problems, it is known from application FR1910401A1, filed in the applicant's name, to use a micro-mirror plate, making it possible to project a light image generated by a light source in the form of a hologram, coupled with a sensor allowing a user to interact with the hologram. This allows the user to avoid touching the exterior surface of the vehicle, so that the drawbacks of the prior art device described above do not arise. However, the projection of the hologram by the micro-mirror plate also causes light interference to appear on either side of the hologram. This can confuse the user in his interaction with the hologram, and in any case creates an undesirable esthetic effect that it is preferable to avoid.

The object of the invention is in particular to remedy these problems by improving the user interface of the prior art in order to make it clearer to use while improving its esthetic appearance.

SUMMARY OF THE INVENTION

To this end, according to the invention, a vehicle part is provided that comprises:

- a light source capable of emitting a light image,
- a micro-mirror plate capable of projecting the light image outside the vehicle part in the form of a hologram,
- at least one privacy filter located between the light source and the hologram, and
- a sensor capable of detecting the presence of any object in a projection plane coinciding at least partially with the hologram.

The presence of a privacy filter on the trajectory of the light beam emitted by the light source makes it possible, unexpectedly, to prevent light pollution formed by artifacts of the hologram located on the periphery of the main hologram, so that the filter eliminates the light interference mentioned above, or at the very least attenuates its visibility. It follows that the user can more easily distinguish the parts of the hologram with which he can interact, for example if it is in the form of a keyboard.

Furthermore, the presence of the privacy filter makes it possible to conceal the hologram for people who are not directly opposite the vehicle part or whose gaze presents an angle greater than or equal to a predetermined value with respect to a main axis of light emission by the light source. Confidentiality is thus provided to the user in that the people next to him, or more generally the people who can see the vehicle other than the user directly in front of the hologram, cannot discern the way in which he interacts with the hologram. This can be useful if the hologram is used, for example, to enter a confidential code for unlocking the vehicle.

Advantageously, the micro-mirror plate is covered by a skin transparent to visible light and infrared.

Sealing is thus provided to the micro-mirror plate, which makes it possible to protect it from moisture and dust. In addition, the elements located behind the skin are hidden, which makes it possible to improve the general esthetics of the vehicle.

Preferably, the skin is made of polycarbonate (PC), polypropylene (PP) or polymethyl methacrylate (PMMA). It is also possible to make the skin from the following materials: acrylonitrile butadiene styrene (ABS), acrylonitrile styrene acrylate (ASA), styrene acrylonitrile (SAN), a mixture of acrylonitrile styrene acrylate and polycarbonate, a mixture of polycarbonate and polyethylene terephthalate, amorphous polyolefin such as cyclo-olefin copolymers (COC) or cyclo-olefin-polymers (COP).

The skin can thus be manufactured inexpensively by molding.

Advantageously, the sensor is formed by an infrared sensor.

The sensor is thus simple to produce.

Advantageously, the vehicle part forms a tailgate, a door, a front, middle or rear pillar, a hood, an exterior mirror or a vehicle bumper.

These types of vehicle parts correspond to areas of the vehicle that lend themselves well to communicating information or receiving instructions.

According to a first embodiment of the invention, the light source comprises an illuminated screen.

Advantageously, the at least one privacy filter is colored and/or metallized.

The privacy filter, which can be seen through the vehicle part according to its configuration, thus participates in the esthetics of the vehicle.

Advantageously, the vehicle part comprises several privacy filters.

According to a first embodiment of the invention, the at least one privacy filter is located facing the micro-mirror plate, it being understood that the at least one privacy filter is located on the reflective side of the micro-mirror plate, at a distance from the micro-mirror plate or in contact with the micro-mirror plate.

According to a second embodiment of the invention, the at least one privacy filter is located opposite the light source, at a distance from the light source or in contact with the light source.

Provision may also be made to combine the first and second embodiments of the invention.

The privacy filter can thus be arranged at several locations in the vehicle part, which contributes to making the invention adaptable to different space constraints in the vehicle part and to the nature of the latter. Provision can moreover be made for the vehicle part to comprise several privacy filters from among the locations presented above, by combining or not combining the first and second embodiments. For example, such filters can be positioned so that they each have different filtering directions, thus filtering the light pollution formed by artifacts of the hologram in each of these directions.

BRIEF DESCRIPTION OF THE FIGURES

The invention will be better understood upon reading the description which follows, given solely by way of example and with reference to the appended drawings, in which.

DETAILED DESCRIPTION

Figure 1:
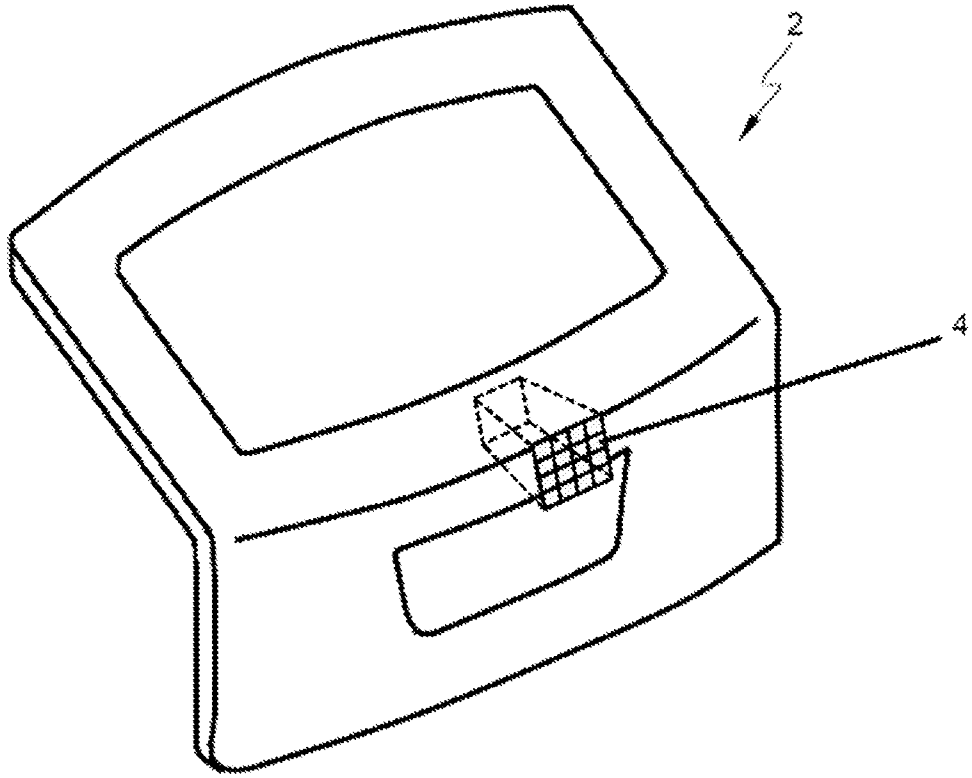
FIG. 1 is a perspective view of a vehicle part according to the invention.

FIG. 1 shows a vehicle part 2 according to the invention. In the present case, the vehicle part 2 forms a motor vehicle tailgate, but it can be provided that it is any other part of a vehicle, such as a door, a front, middle or rear pillar, a hood, an exterior mirror or a bumper, to name a few examples. As visible, a hologram 4 is displayed is visible to anyone standing in front of the vehicle part 2.

Figure 2:
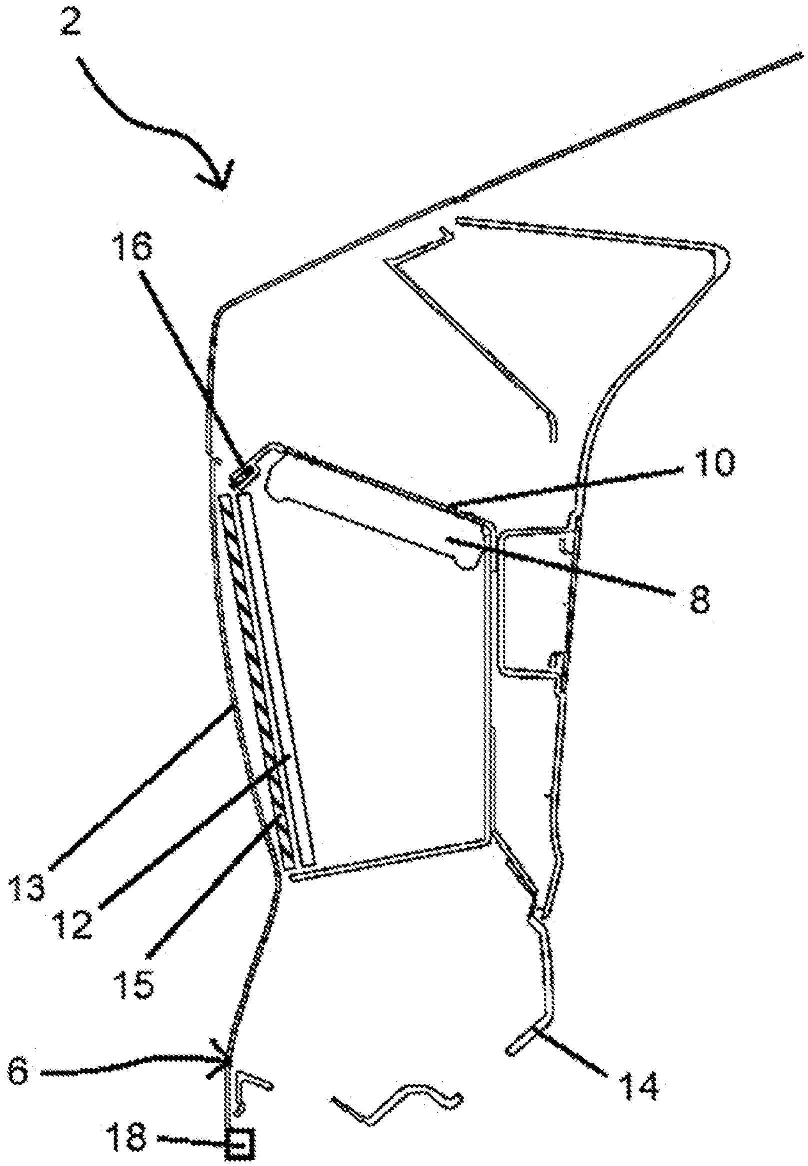
FIG. 2 is a sectional view of a vehicle part according to a first embodiment of the invention, in the deactivated state.

The vehicle part 2 is shown in more detail in FIG. 2. The vehicle part 2 comprises a body element 6 corresponding to the primary function of the vehicle part 2. In the present case, it is a tailgate, which will not be described further below.

The vehicle part 2 comprises a light source 8 capable of emitting a light image. This light source 8 here is formed by an illuminated screen, of generally flat shape, carried by a support 10 fastened to the body element 6. The light source 8 is coupled with an electronic control unit (ECU) 11 that enables the illuminated screen to emit a light image.

The vehicle part 2 comprises a micro-mirror plate 12 capable of projecting the light image, generated by the light source 8, outside the vehicle part 2. The micro-mirror plate 12 is coupled to the ECU 11. An example of a micro-mirror plate 12 is marketed by Asukanet under the name "Aska3D." Since the concept of a micro-mirror plate as such is known, it will not be described further in the following. The enclosure formed by the light source 8, the micro-mirror plate 12 and part of the body element 6 must form an enclosure that is sealed against humidity, dust and light, in the sense that natural light or light from other adjacent light sources must not be able to penetrate it, and that is not reflective, in order not to disturb the generation and projection of the hologram. In order to make the enclosure non-reflective, it is possible to use matte black paint, black velvet or felt, or any type of non-reflective or ultra-absorbent black paint.

The body element 6 comprises a skin 13 covering the micro-mirror plate 12 in order to protect it from external mechanical stresses that could damage it. The skin 13 is made of a transparent material. Here, the term "transparent" means that the material is at least transparent to any light radiation having a wavelength comprised in the visible spectrum, that is to say, comprised between approximately 380 and 780 nm, and in the infrared, that is to say, between 700 and 20,000 nm in the context of the invention. The skin 13 here is made of a plastic having this characteristic, in this case polycarbonate, commonly referred to as "PC." However, provision can be made to produce the skin from any other plastic having this characteristic, such as polypropylene (PP) or polymethyl methacrylate (PMMA). The skin 13 can be semi-transparent in order to hide the micro-mirror plate 12 from view, and non-diffusing so as not to make the hologram cloudy. Here, the term "semi-transparent" means that the skin 13 only transmits part of the visible light, for example up to 10% to 40%. This surface reduces the luminosity of the hologram 4, but does not prevent its generation. The body element 6 further comprises a structural lining 14 so as to form, with the skin 13, the body element 6.

The vehicle part 2 comprises at least one privacy filter 15 here positioned between the micro-mirror plate 12 and the skin 13. In the space between these two elements, the privacy filter 15 is located opposite the micro-mirror plate 12, against the latter or at a distance from the latter. Alternatively, the privacy filter 15 can be located facing the other surface of the micro-mirror plate 12, against it or at a distance from it, so that the latter is positioned between the skin 13 and the privacy filter 15.

The privacy filter 15 is in the form of a sheet of general shape similar to that of the micro-mirror plate 12, here flat, which covers the entire transmission or reflection surface of the mirror plate 12. As one embodiment, the privacy filter can allow the passage of light in an angular range of 60° amplitude centered on an axis perpendicular to the privacy filter 15, here comprised in the cutting plane of FIG. 2. However, any other value can be provided for this angular range, and this angular range can be in two dimensions, namely in the form of an angular sector in a plane, or in three dimensions, for example in the form of a cone. Alternatively, such a filter can be replaced by a plurality of filters, each allowing the passage of light in a flat angular range, each centered on an axis perpendicular to the privacy filter, each of the filters being positioned so that the angular ranges are not located in the same plane. The privacy filter 15 functions in the same way as a computer screen filter and is therefore known per se, such that it will not be described further as such in the following.

In the case where the skin 13 is semi-transparent, the privacy filter 15 can be seen from outside the vehicle. It is possible to provide for coloring and/or metallizing the privacy filter 15, giving it a "one-way mirror" effect so as not to break the non-reflective appearance of the enclosure mentioned above, so that it participates in the esthetics of the vehicle part 2.

The vehicle part 2 comprises a sensor 16, here an infrared sensor. The sensor 16 is coupled to the ECU 11, carried by the support 10 and covered by the skin 13. The function of the sensor 16 will be described later.

In FIG. 2, the vehicle part 2 is in a deactivated state, which means that the light source 8 is off and no hologram is generated.

Figure 3:
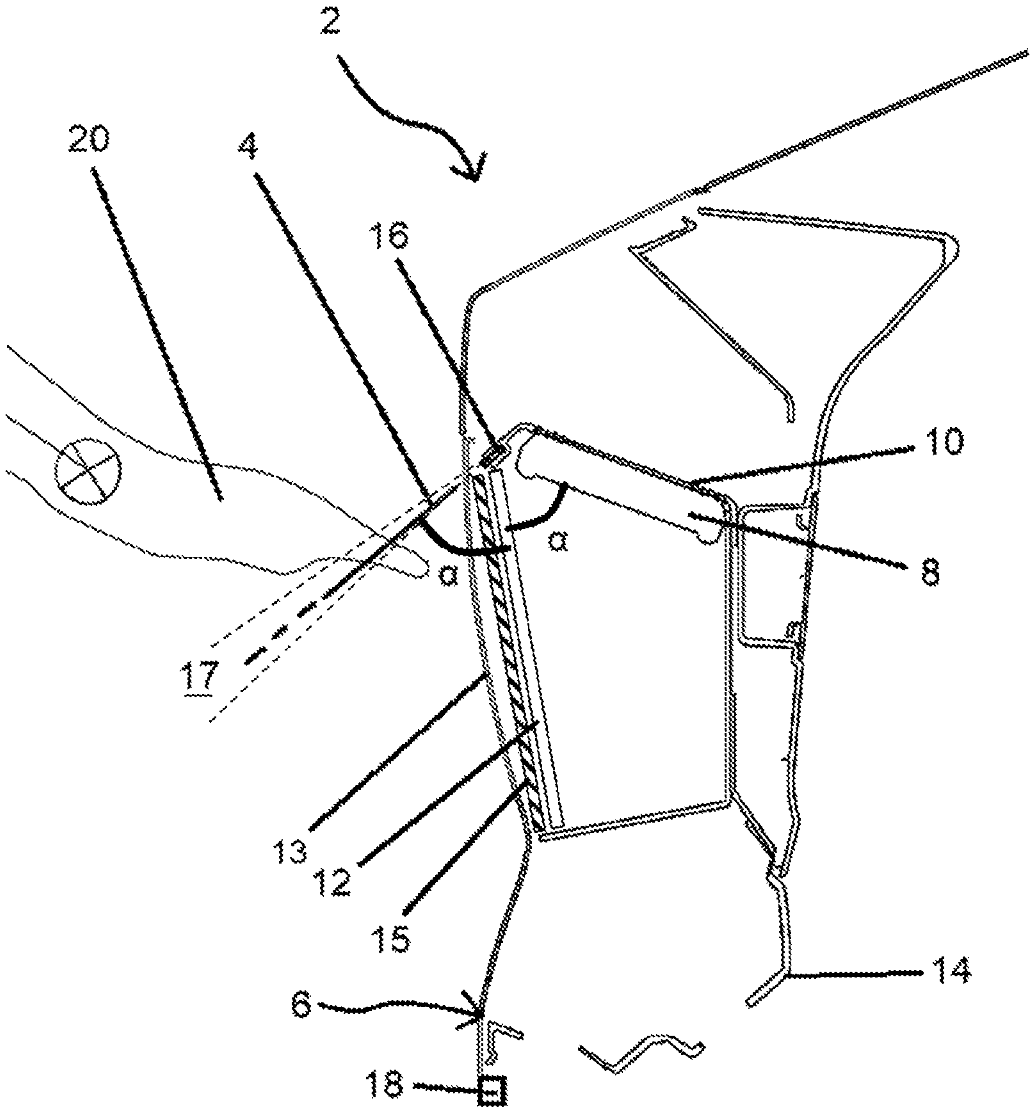
FIG. 3 is a sectional view of the vehicle part of FIG. 2, in the activated state.

FIG. 3 illustrates the vehicle part 2 when activated. This activation can be controlled using a detector 18 capable of detecting the approach of a person toward the vehicle part 2 and under certain possible additional predetermined conditions, for example the detection of the vehicle key. Here, the detector 18 comprises a position sensor fastened to the exterior of the vehicle part 2. When the detector 18 detects that a person is approaching the vehicle part 2, it sends a signal to the ECU 11 to activate the light source 8 and the micro-mirror plate 12.

In the activated state, the light source 8 is on and generates a light image. This light image is emitted in the direction of the micro-mirror plate 12, which projects the light image outside the vehicle part 2 so as to generate the hologram 4. Since the illuminated screen is generally flat in shape, the hologram 4 has a flat shape. The privacy filter 15 restricts the generation of the hologram 4 in the predetermined angular range presented above, which makes it possible to prevent the formation of light interference at the periphery of the hologram 4. The micro-mirror plate 12 projects the hologram 4 such that the angle α between the illuminated screen and the micro-mirror plate 12 is equal to the angle between the micro-mirror plate 12 and the plane of the hologram 4. It is thus understood that by choosing the arrangement of the light source 8 with respect to the micro-mirror plate 12, it is possible to modulate the inclination of the hologram 4 with respect to the vehicle part 2. In the present case, an angle α of approximately 50° is particularly convenient so that the hologram 4 is clearly visible and has an ergonomic position.

The sensor 16 is oriented so that it can detect the presence of any object located in a detection area 17, delimited in FIG. 3 by two dotted lines, in which the hologram 4 is located. If the ECU 11 expects an interaction by the user 20 with the hologram 4, it can insert into the image, and therefore into the hologram that is projected, text inviting the user to interact with the hologram as well at least one area in which he can interact, for example a keyboard. When the user 20 crosses said area with his finger as illustrated in FIG. 3, this is detected by the sensor 16, which transmits this information to the ECU 11 to indicate to it that the user 20 has interacted with the hologram 4. In other words, the ECU 11 reacts to the position of the finger on the hologram 4.

An example application of this system is the display of information. Examples of information include the state of charge of the vehicle batteries, a diagnosis of the state of the vehicle, etc.

Another example application of this system is the unlocking of the vehicle. When the user 20 approaches the vehicle, the vehicle part 2 returns to the activated state, displays a keyboard in the hologram 4 and invites the user 20 to enter his code. With his finger, he types his code into the hologram 4. The keys of the keyboard of the hologram 4 actuated by the user 20 are determined owing to the sensor 16. If the code entered is correct, the ECU 11 issues an instruction to unlock the vehicle. Otherwise, the ECU 11 is programmed to indicate that the code entered is incorrect and then to re-invite the user to type in his code. Other possible applications are the unlocking of only part of the vehicle, for example an access hatch to a compartment of the vehicle, the switching on of a light signal, or the launching of a parking space exit program in autonomous mode, to name but a few examples.

Figure 4:
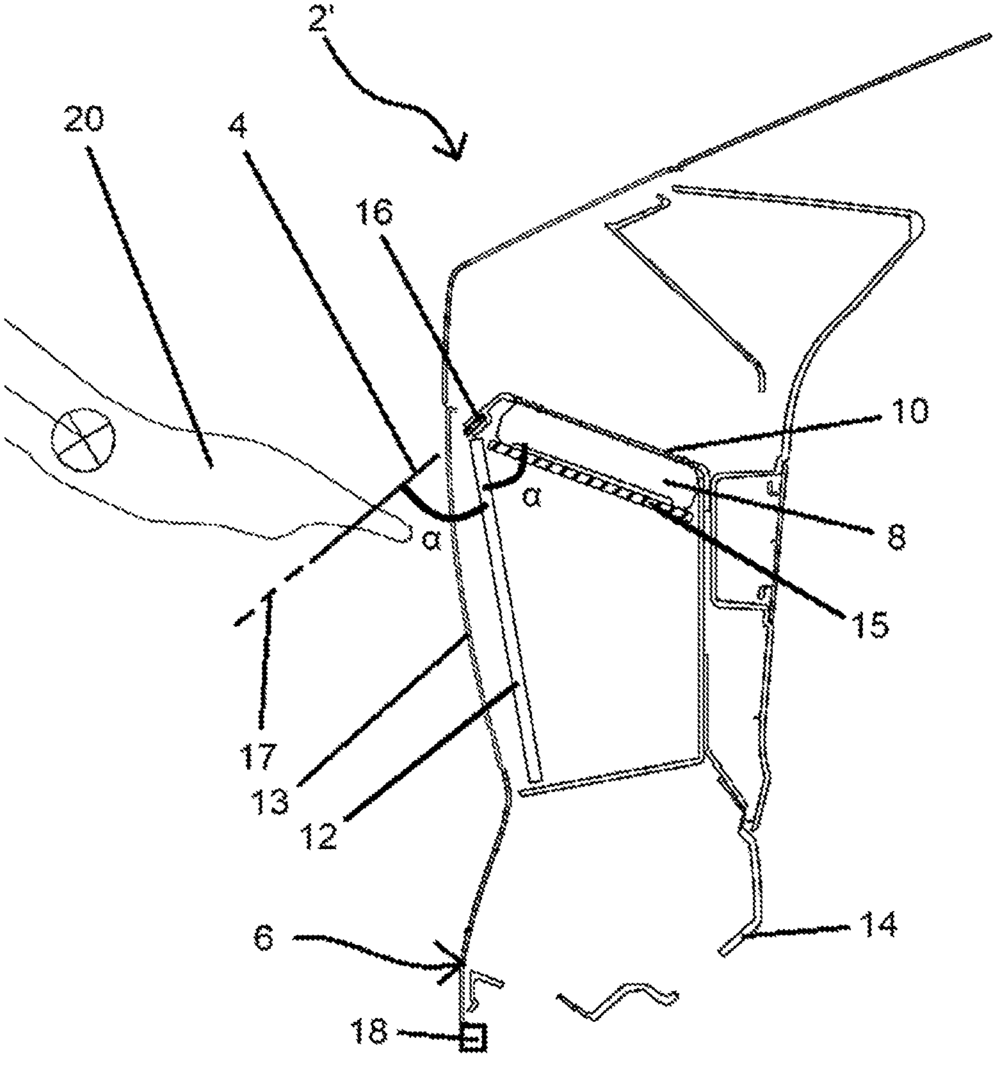
FIG. 4 is a sectional view of a vehicle part, similar to the view of FIG. 3, according to a second embodiment of the invention.

FIG. 4 shows a vehicle part 2' according to a second embodiment of the invention. The privacy filter 15 here is pressed against the light source 8, so that it is positioned between the light source 8 and the micro-mirror plate 12. According to this configuration, the privacy filter 15 decreases the luminosity of the hologram 4 compared to the configuration of the first embodiment. It thus allows a more discreet hologram 4 to be generated. The projection of the hologram 4 and the interaction with it operate in the same way as in the previous embodiment. As a variant embodiment, it is also possible to place the privacy filter facing the light source, while being located at a distance from the latter.

The invention is not limited to the embodiments described here, and other embodiments will become clearly apparent to a person skilled in the art.

It is possible to combine the two embodiments described above in the case where the vehicle part comprises several privacy filters.

It is possible to use any type of light source suitable for generating the hologram, for example those listed below: flat screen, curved screen, screen coupled with a magnifying lens, video projector coupled with a projection screen, video projector with short focal length coupled with a projection screen, video projector coupled with a rear projection screen.

LIST OF REFERENCES

2: vehicle part
4: hologram
6: body element
8: light source
10: support
11: electronic control unit (ECU)
12: micro-mirror plate
13: skin
14: structural lining
15: privacy filter
16: sensor
17: detection area
18: detector
20: user

The invention claimed is:

1. A vehicle part, comprising:
a light source capable of emitting a light image,
a micro-mirror plate capable of projecting the light image outside the vehicle part in a form of a hologram,
a plurality of privacy filters located between the light source and the hologram, each of the plurality of privacy filters limiting, by filtering light, an angular range of the light image passing through the respective privacy filter to within a predetermined angular range centered on an axis perpendicular to an exit surface of the respective privacy filter, and attenuating light pollution formed by artifacts of the hologram located on a periphery of the hologram, and
a sensor capable of detecting a presence of any object in a projection plane coinciding at least partially with the hologram,
wherein the plurality of privacy filters are positioned such that each of the plurality of privacy filters has a different filtering direction, the plurality of privacy filters filtering the light pollution formed by the artifacts of the hologram in each of the different filtering directions.

2. The vehicle part according to claim 1, wherein the micro-mirror plate is covered by a skin transparent to visible light and infrared.

3. The vehicle part according to claim 2, wherein the skin is made of polycarbonate, polypropylene or polymethyl methacrylate.

4. The vehicle part according to claim 1, wherein the sensor is formed by an infrared sensor.

5. The vehicle part according to claim 1, forming a tailgate, a door, a front, middle or rear pillar, a hood, an exterior mirror or a vehicle bumper.

6. The vehicle part according to claim 1, wherein the light source comprises an illuminated screen.

7. The vehicle part according to claim 1, wherein at least one of the plurality of privacy filters is colored and/or metallized.

8. The vehicle part according to claim 1, wherein at least one of the plurality of privacy filters is located adjacent to the micro-mirror plate.

9. The vehicle part according to claim 8, wherein at least one of the plurality of privacy filters is located at a distance from the micro-mirror plate.

10. The vehicle part according to claim 8, wherein at least one of the plurality of privacy filters is in contact with the micro-mirror plate.

11. The vehicle part according to claim 1, wherein at least one of the plurality of privacy filters is located adjacent to the light source.

12. The vehicle part according to claim 11, wherein at least one privacy filters is located at a distance from the light source.

13. The vehicle part according to claim 11, wherein at least one of the plurality of privacy filters is in contact with the light source.

14. The vehicle part according to claim 1, wherein the predetermined angular range is a 60-degree range.

15. The vehicle part according to claim 1, wherein at least one of the plurality of privacy filters is in a form of a flat sheet in a location between the light source and the hologram.

16. The vehicle part according to claim 1, wherein at least one of the plurality of privacy filters further conceals the hologram from observers whose gaze presents an angle greater than the predetermined angular range.

17. A vehicle part, comprising:

a light source capable of emitting a light image, a micro-mirror plate capable of projecting the light image outside the vehicle part in a form of a hologram, a plurality of privacy filters, each in a form of a flat sheet, located between the light source and the hologram, each of the plurality of privacy filters limiting, by filtering light, an angular range of the light image passing through the respective privacy filter to within a predetermined angular range centered on an axis perpendicular to a flat exit surface of the respective privacy filter, attenuating light pollution formed by artifacts of the hologram located on a periphery of the hologram, and concealing the hologram from observers whose gaze presents an angle greater than the predetermined angular range, and a sensor capable of detecting a presence of any object in a projection plane coinciding at least partially with the hologram, wherein at least one of the plurality of privacy filters is adjacent to the micro-mirror plate or is adjacent to the light source, and wherein the plurality of privacy filters are positioned such that each of the plurality of privacy filters has a different filtering direction, the plurality of privacy filters filtering the light pollution formed by the artifacts of the hologram in each of the different filtering directions.

18. The vehicle part according to claim 17, wherein the predetermined angular range is a 60-degree range.

* * * * *